(12) United States Patent
Keene et al.

(10) Patent No.: US 8,235,396 B2
(45) Date of Patent: *Aug. 7, 2012

(54) ANNULAR SEAL

(75) Inventors: Kendall E. Keene, Houston, TX (US); John C. Vicic, Spring, TX (US)

(73) Assignee: Cameron International Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/819,098

(22) Filed: Jun. 18, 2010

(65) Prior Publication Data

US 2010/0320695 A1    Dec. 23, 2010

Related U.S. Application Data

(63) Continuation of application No. 10/664,747, filed on Sep. 18, 2003, now Pat. No. 7,740,248.

(51) Int. Cl.
*F16L 17/00* (2006.01)
*F16J 15/02* (2006.01)

(52) U.S. Cl. ........ 277/603; 277/609; 277/611; 277/644; 285/351

(58) Field of Classification Search ............ 277/338, 277/323–324, 603, 606–609, 611, 615–616, 277/619, 625–628, 638–639, 641, 644, 650; 285/123.12, 351

See application file for complete search history.

(56) References Cited

U.S. PATENT DOCUMENTS

| | | |
|---|---|---|
| 1,350,553 A | 8/1920 | Mack |
| 2,829,909 A | 4/1958 | Magnani |
| 2,988,148 A | 6/1961 | Conrad et al. |
| 3,229,767 A | 1/1966 | Carter |
| 3,554,280 A | 1/1971 | Tucker |
| 3,836,159 A | 9/1974 | Dryer |
| 3,869,132 A | 3/1975 | Taylor et al. |
| 3,924,907 A * | 12/1975 | Czernik et al. .............. 384/36 |
| 4,106,779 A | 8/1978 | Zabcik |
| 4,188,998 A | 2/1980 | Upton |
| 4,326,588 A | 4/1982 | McStravick |
| 4,381,114 A | 4/1983 | Vanderford, Jr. |
| 4,429,854 A | 2/1984 | Kar et al. |
| 4,496,162 A | 1/1985 | McEver et al. |
| 4,501,430 A | 2/1985 | Kuhl et al. |
| 4,553,759 A | 11/1985 | Kilmoyer |

(Continued)

FOREIGN PATENT DOCUMENTS

EP    0579379    1/1994

(Continued)

*Primary Examiner* — Vishal Patel
(74) *Attorney, Agent, or Firm* — Fletcher Yoder, P.C.

(57) ABSTRACT

A seal assembly capable of low temperature service is disclosed. It features upper and lower metallic backup rings that are specially shaped to act as a spring to keep the sidewalls of such rings in contact with the inside and outside surfaces to be sealed to prevent extrusion of the seal material even in low temperature situations. Inner and outer grooves are provided. O-ring seals, used for the ID of the seal, are manufactured to have a slightly greater diameter than the groove into which they will be installed. The greater length provides stored energy to promote sealing functionality in cold temperature situations. The O-rings used for the OD of the seal are manufactured to have a slightly smaller diameter than the groove into which they will be installed. The shorter length provides stored energy to promote sealing functionality in cold temperature situations.

18 Claims, 1 Drawing Sheet

U.S. PATENT DOCUMENTS

| | | |
|---|---|---|
| 4,715,624 A | 12/1987 | Frye |
| 6,007,105 A | 12/1999 | Dietle et al. |
| 6,224,063 B1 | 5/2001 | Faass |
| 6,224,065 B1 | 5/2001 | Smith |
| 6,705,615 B2 | 3/2004 | Milberger et al. |
| 2003/0209857 A1 | 11/2003 | Keene |
| 2004/0017047 A1 | 1/2004 | Taylor et al. |

FOREIGN PATENT DOCUMENTS

| | | |
|---|---|---|
| GB | 2353336 | 2/2001 |
| WO | 03/095873 A3 | 11/2003 |

* cited by examiner

ANNULAR SEAL

RELATED APPLICATIONS

This application is a Continuation of application Ser. No. 10/664,747, filed Sep. 18, 2003 now U.S. Pat. No. 7,740,248, entitled "Annular Seal" in the name of Kendall E. Keene et al.

FIELD OF THE INVENTION

The field of this invention is sealing annular spaces in wellhead or downhole applications and, more particularly, where low temperature exposure to the seal assembly is anticipated.

BACKGROUND OF THE INVENTION

Seals for annular spaces in downhole applications have to respond to a variety of changing conditions. During production, the produced fluids can raise operating temperatures to 350° F. or more. On the other hand, particularly in frigid climates and during shut in periods of no production, the surrounding temperature around a wellbore seal can plunge to 35° F. or even less. Traditional annular non-metallic seal designs employ anti-extrusion barriers on the top and the bottom. These devices or rings often follow the generally rectangular shape of the seal, when viewed in section. The backup rings have a generally U-shape and feature slight interference on the inside diameter and more significant interference on the outside diameter, as installed. An example of the generally U-shaped design for the anti-extrusion ring in an annular seal can be seen in U.S. Pat. No. 4,496,162. In a variation of this design, additional seal material has been added to the inside dimension of the seal assembly to make a portion of the seal protrude beyond the backup rings on the inside diameter dimension. Even though an increase in the inside diameter interference reduced failures at low temperatures, the prior design proved unreliable in exposure to even colder temperatures as experienced in shut in conditions in the harshest cold climates. Additionally, the increase in inside diameter interference made the seal significantly more difficult to install. Compression packer seals are generally illustrated in U.S. Pat. Nos. 1,350,553; 3,229,767; 3,554,280 and 4,326,588.

In the present invention, installation interference that activates the seal is generated by the relaxed OD of the seal being larger than the OD of the annular gap the seal is being installed in and the relaxed ID of the seal being smaller than the ID of the annular gap the seal is being installed in. The seal does not rely of any external axial load to function. The seal is assisted by pressure during normal functionality.

Accordingly, the present invention presents improvements to seal design to handle the colder environments. In one feature, the backup ring design has been revised to allow it to act as a spring to promote its ability to act as an extrusion barrier. In another development, resilient ring seals have been placed in the seal body and dimensionally configured to be installed in their respective grooves with a residual stored force to promote the operation of the seal assembly in reduced temperature environments. These and other features of the present invention will be more apparent to those skilled in the art from a review of the description of the preferred embodiment and the claims, which appear below.

SUMMARY OF THE INVENTION

A seal assembly capable of low temperature service is disclosed. It features upper and lower metallic backup rings that are specially shaped to act as a spring to keep the sidewalls of such rings in contact with the inside and outside surfaces to be sealed to prevent extrusion of the seal material even in low temperature situations. Inner and outer grooves are provided. O-ring seals, used for the ID of the seal, are manufactured to have a slightly greater diameter than the groove into which they will be installed. The greater length provides stored energy to promote sealing functionality in cold temperature situations. The O-rings used for the OD of the seal are manufactured to have a slightly smaller diameter than the groove into which they will be installed. The shorter length provides stored energy to promote sealing functionality in cold temperature situations.

DETAILED DESCRIPTION OF THE PREFERRED EMBODIMENT

Figure 1:
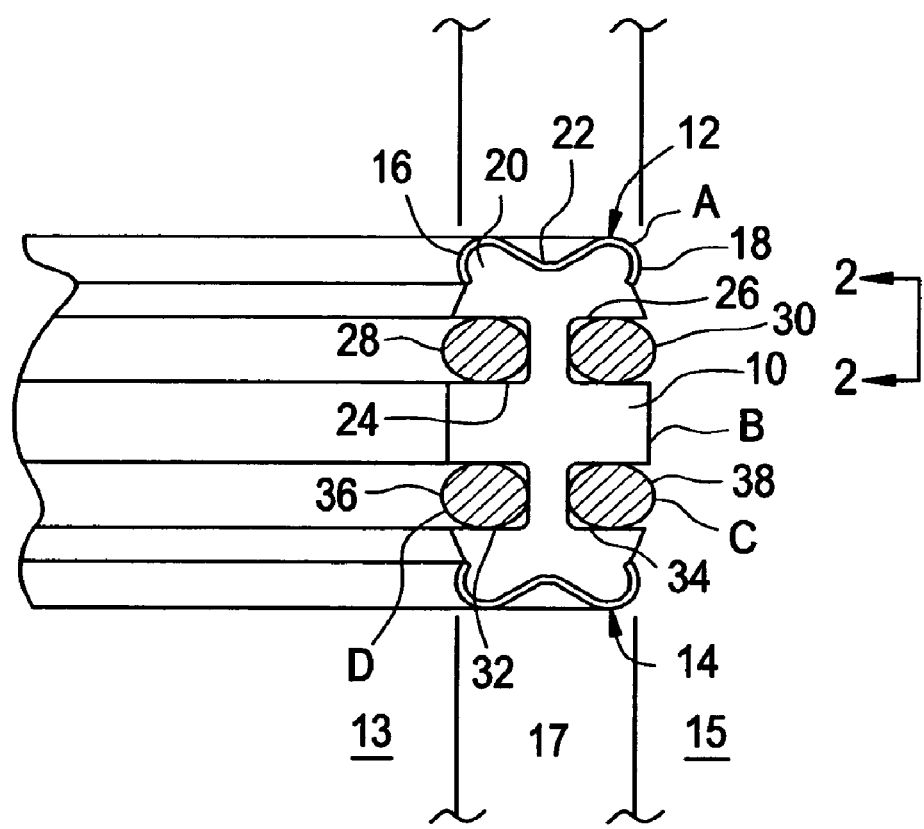
FIG. 1 is a sectional view of the preferred embodiment of the present invention.

The seal of the present invention is shown in FIG. 1. The seal has a body 10 and an upper backup ring 12 and a lower backup ring 14. The ring 12 may be formed of metal or plastic. The preferred embodiment is metal. The details of ring 12 will be described with the understanding that the preferred embodiment uses an identical ring 14. The invention does not require identical rings 12 and 14 and is functional with only one of such rings. Ring 12 features inwardly looping ends 16 and 18 that can be snapped onto the body 10 in a gripping engagement under a residual force. In essence, the upper end 20 of the seal body 10 is subjected to a compressive force by the ends 16 and 18. At the same time, the ends 16 and 18 are forced into an interference fit in the annular gap in which the seal is disposed. The ring 12 has a bend 22 that absorbs and stores a force as ends 16 and 18 are pushed into the interference fit of the annular space in which they are mounted. As a result, ring 12 acts as a spring due to the placement of bend 22. This spring effect pushes the ends 16 and 18 away from each other and into contact with the opposing walls that define the annular space that the seal assembly is intended to close. Installation of the ring 12 into the annular space causes it to elastically deform while transferring potential energy into bend 22. By design, the bulk of the bending by installation of the seal assembly occurs at bend 22. The ring 12 may be shaped to allow pressure to enhance or diminish the energy stored in the bend. The shape of the ring 12 may also be used to control the amount of force, generated by pressure, that is passed through to the body 20.

The body 10 can be made of a plastic or an elastomeric material having a Durometer hardness of preferably about 85 to 90 and optionally with reinforcement of preferably glass or carbon fibers. Alternatively, reinforced PTFE can be used. The body 10 comprises grooves 24 and 26 that respectively hold ring seals 28 and 30. Additionally, grooves 32 and 34 respectively retain ring seals 36 and 38. Body 10 adds support to rings 12 and 14 and acts to force the rings out to prevent extrusion. The grooves can be square cut, dovetailed or round bottomed. The latter form is preferred due to its ability to provide a more nearly volume filled arrangement.

Rings 30 and 38 are the main sealing members. Optionally, only one ring can be used on the outside diameter or more than two rings. The preferred material is about a 65 to 85 Durometer Arctic Nitrile to enhance low temperature performance. In the preferred embodiment, there is radial interference on rings 30 and 38 when installed in the annular gap to be sealed. Interference in the range of about 20-25% of the diameter of the ring 30 or 38 is preferred, with a minimum interference of at least about 0.015 inches. This configuration minimizes diametral stretch. Additionally, rings 30 and 38 are preferably shorter in circumference than their respective grooves 26 and 34 by about 6-20% to better retain them in the grooves for insertion into the annular space and during operation, particularly in lower temperature conditions.

With regard to inside diameter rings 28 and 36, it is preferred that they be sized so that they are circumferentially compressed when installed into their respective grooves 24 and 32. A circumferential compression in the range of about 8-15% of the relaxed circumference is preferred. This is achieved by making the circumference of rings 28 and 36 about 8-15% longer than the groove into which it is to be mounted. The larger the oversize, with the rings still in their respective grooves, the greater is the force against backup rings 12 and 14 and, in turn, the greater is the stored force in rings 12 and 14 to force the ends, such as 16 and 18 against the inner and outer surfaces that define the annular gap that the seal assembly is meant to close. The preferred material is about a 65 to 85 Durometer Arctic Nitrile to enhance low temperature performance. When rings 28 and 36 are installed and in contact with the inside diameter the circumferential compression results in an axial wave pattern occurring in the respective groove as well as some pushing of grooves 24 and 32 toward grooves 26 and 34 respectively. This wave deformation in the axial direction along the circumference puts an additional axial force against rings 12 and 14 to cause their respective ends, such as 16 and 18 to splay apart for better contact with the walls that define the inner and outer surfaces to be sealed by the seal assembly.

Figure 2:
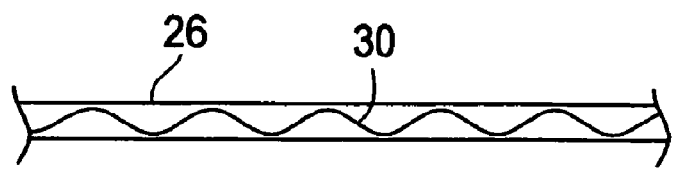
FIG. 2 is a view of a ring such as 30 along lines 2-2 of FIG. 1 showing the undulating wave pattern.

While the seal assembly has been illustrated for use in a static condition, the design is workable in a dynamic situation. Those skilled in the art will appreciate that the seal assembly can be mounted for support in a groove in the inner 13 or outer body 15 forming the annular gap 17 that the seal assembly is designed to close. The backup rings 12 and 18 can be optionally used without the seal rings 28, 30, 36, and 38. FIG. 2 shows the undulating profile viewed in the axial direction after assembly of one of said rings to an associated groove. Alternatively any number of seal rings can be used on the inside or the outside diameter. Alternatively, one or more seal rings in groove can be used only on the inside or the outside diameter, within the scope of the invention.

The foregoing disclosure and description of the invention are illustrative and explanatory thereof, and various changes in the size, shape and materials, as well as in the details of the illustrated construction, may be made without departing from the spirit of the invention.

We claim:

1. A seal assembly for sealing an annular gap between first and second bodies, comprising:
   an annular body having first and second ends, wherein the annular body comprises at least one notched portion disposed between the first and second ends, and the seal assembly comprises a first sealing ring disposed in a first notched portion of the annular body and configured to provide a biasing force in a radially inward direction with respect to the annular body;
   at least one backup ring disposed on one of the first or second ends, the backup ring comprising:
   a pair of loop ends extending toward the annular body and configured to secure the backup ring to the annular body; and
   an inflected portion located between the loop ends and in abutment with the annular body, wherein the inflected portion facilitates elastic deformation of the backup ring.

2. The seal assembly of claim 1, wherein the inflected portion is configured to absorb forces when the pair of loop ends are forced into the annular gap between the first and second bodies.

3. The seal assembly of claim 2, wherein the pair of loop ends are configured to bias away from each other due at least in part to the forces absorbed by the inflected portion.

4. The seal assembly of claim 1, wherein the pair of loop ends are generally u-shaped, and the inflected portion is generally v-shaped.

5. The seal assembly of claim 1, wherein the first notched portion comprises a bottom and a first circumference at the bottom, wherein a second circumference of the first sealing ring at a location nearest the first circumference of the first notched portion is configured to differ before mounting from the first circumference of the first notched portion to provide a net radial force to the annular body.

6. The seal assembly of claim 5, wherein the second circumference of the first sealing ring is approximately 8-15% different from the first circumference of the first notched portion in which it is installed.

7. The seal assembly of claim 5, wherein the annular body comprises a second sealing ring in a second notched portion disposed on an opposite side of the annular body from the first sealing ring, wherein the second sealing ring is configured, when the annular body is installed in the annular gap between the first and second bodies, to form an interference fit with one of the first and second bodies to an extent of at least approximately 20% of the cross-sectional diameter of the second sealing ring.

8. The seal assembly of claim 1, wherein the annular body comprises a longitudinal axis, and the pair of loop ends extend radially toward one another relative to the longitudinal axis to grip the annular body.

9. The seal assembly of claim 1, wherein the pair of loop ends continuously extend toward one another.

10. A seal assembly for closing off an annular gap between a first and second body and supported by at least one of the first and second bodies, comprising:
    an annularly shaped body having an upper and a lower end and a longitudinal axis, wherein the annularly shaped body comprises at least one first ring in a first groove, the first groove having a bottom and a first circumference at the bottom, wherein a second circumference of the first ring at a location nearest the first circumference of the first groove is configured to differ before mounting from the first circumference of the first groove to provide a net radial force to the annularly shaped body; and
    at least one backup ring mounted on one of the ends of the annularly shaped body and configured to have a relaxed dimension greater than the annular gap between the first and second bodies so that opposed loop ends on the backup ring are compressed to be inserted in the annular gap, the backup ring comprising a bend between the opposed loop ends configured to store a force created by insertion of the backup ring into the annular gap and to apply the force on the opposed loop ends against the first and second bodies.

11. The seal assembly of claim 10, wherein the opposed loop ends are configured to bias away from each other due at least in part to the forces stored by the bend.

12. The seal assembly of claim 11, wherein the opposed loop ends are generally u-shaped, and the bend is generally v-shaped.

13. The seal assembly of claim 10, wherein the first ring is configured to contact the one of said first and second bodies with the larger dimension; wherein the first ring is configured, when the annularly shaped body is installed in the annular gap, to form an interference fit with the one of the first and second bodies to an extent of at least approximately 20% of the cross-sectional diameter of the first ring.

14. The seal assembly of claim 10, wherein:
the annularly shaped body comprises at least one second ring in a second groove disposed on an opposite side of the annularly shaped body from the first ring;
the second ring is configured to contact the one of the first and second bodies with the larger dimension; and
the second ring is configured, when the annularly shaped body is installed in the annular gap, to form an interference fit with the one of said first and second bodies to an extent of at least approximately 20% of the cross-sectional diameter of the second ring.

15. The seal assembly of claim 10, wherein the first ring is softer than the annularly shaped body.

16. The seal assembly of claim 10, wherein the first ring is configured, when placed in contact with one of the first and second bodies, to deform the first groove to force the opposed loop ends of the backup ring away from each other, and in response to the deformation of the first groove the first ring is configured to deform into an undulating wave pattern in an axial direction parallel to the longitudinal axis.

17. The seal assembly of claim 10, wherein the opposed loop ends extend radially toward one another relative to the longitudinal axis to grip the annular body.

18. A seal assembly for sealing an annular gap between first and second bodies, comprising a pair of backup rings on first and second ends of an annular body; wherein each backup ring comprises a pair of u-shaped loops extending radially toward one another radially into the annular body and securing the backup ring to the annular body; wherein each pair of u-shaped loops are connected by a v-shaped bend that facilitates elastic deformation of the backup ring; and wherein the annular body comprises a plurality of rectangular grooves with sealing rings on sides of the annular body between the pair of backup rings.

* * * * *